US011575295B2

(12) United States Patent
Ha

(10) Patent No.: US 11,575,295 B2
(45) Date of Patent: Feb. 7, 2023

(54) GENERATOR

(71) Applicant: LG ELECTRONICS INC., Seoul (KR)

(72) Inventor: Seunghyoung Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 226 days.

(21) Appl. No.: 17/002,985

(22) Filed: Aug. 26, 2020

(65) Prior Publication Data
US 2021/0067004 A1 Mar. 4, 2021

(30) Foreign Application Priority Data

Aug. 30, 2019 (KR) .......................... 10-2019-0107605

(51) Int. Cl.
H02K 9/06 (2006.01)
F16C 37/00 (2006.01)
(Continued)

(52) U.S. Cl.
CPC .............. H02K 9/06 (2013.01); F16C 37/00 (2013.01); H02K 1/32 (2013.01); H02K 5/04 (2013.01);
(Continued)

(58) Field of Classification Search
CPC .. H02K 9/06; H02K 1/32; H02K 5/04; H02K 5/16; H02K 5/20; H02K 5/18; H02K 9/04;
(Continued)

(56) References Cited

U.S. PATENT DOCUMENTS 4,469,966 A * 9/1984 Iwaki .................... H02K 19/36
310/63
6,445,099 B1 * 9/2002 Roseman ............... F16C 39/02
310/90
(Continued)

FOREIGN PATENT DOCUMENTS

FR 3036874 12/2016
JP S51-36005 3/1976
(Continued)

OTHER PUBLICATIONS

European Search Report dated Jan. 12, 2021 issued in Application No. 20193106.0.

Primary Examiner — Ahmed Elnakib
(74) Attorney, Agent, or Firm — KED & Associates, LLP

(57) ABSTRACT

A generator includes a housing; a rotational shaft at least partially inserted into the housing; a rotor coupled to the rotational shaft and rotated together when the rotational shaft is rotated; a stator positioned between an inner surface of the housing and an outer surface of the rotor; a cooling module including a fan cover coupled to the housing, and a fan installed inside of the fan cover to generate a flow of an air passing through an inside of the housing; and a rotation support part including a cylindrical bearing holder positioned inside of the housing, and a bearing which is coupled to an inner circumferential surface of the bearing holder and rotatably supports the rotational shaft, the bearing holder forming a flow path of the air blown by the fan in at least one of an inner side or an outer side.

17 Claims, 5 Drawing Sheets

(51) Int. Cl.

| | |
|---|---|
| *H02K 5/16* | (2006.01) |
| *H02K 5/20* | (2006.01) |
| *H02K 1/32* | (2006.01) |
| *H02K 5/04* | (2006.01) |
| *H02K 9/04* | (2006.01) |
| *H02K 5/18* | (2006.01) |

(52) U.S. Cl.
CPC ............... *H02K 5/16* (2013.01); *H02K 5/20* (2013.01); *H02K 5/18* (2013.01); *H02K 9/04* (2013.01)

(58) Field of Classification Search
CPC .... H02K 7/1815; H02K 5/1732; H02K 7/083; H02K 9/19; H02K 5/161; H02K 2205/09; F16C 37/00
USPC ....... 310/52, 58, 59, 60 R, 61, 62, 63, 60 A, 310/89, 90, 91
See application file for complete search history.

(56) References Cited

U.S. PATENT DOCUMENTS

2002/0047470 A1* 4/2002 Shioya ................... H01R 39/38
    310/239
2007/0052319 A1   3/2007 Morikaku et al.

FOREIGN PATENT DOCUMENTS

| JP | S59-14339 | 1/1984 |
|---|---|---|
| JP | S64-20067 | 1/1989 |
| KR | 10-2002-0021874 | 3/2002 |

* cited by examiner

FIG. 3A      FIG. 3B
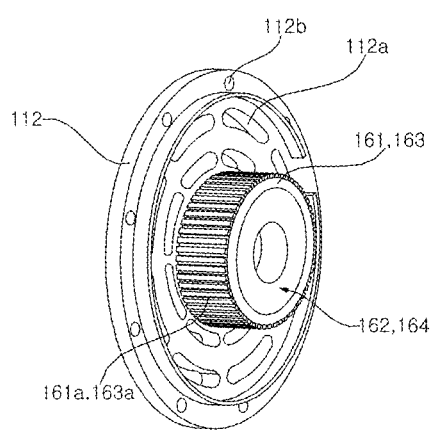
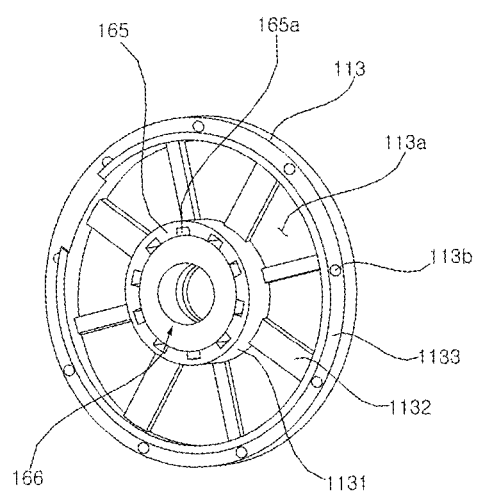

GENERATOR

CROSS-REFERENCE TO RELATED APPLICATION

This application claims the priority from Korean Patent Application No. 10-2019-0107605, filed on Aug. 30, 2019, in the Korean Intellectual Property Office, the disclosure of which is incorporated herein by reference in its entirety.

BACKGROUND OF THE INVENTION

1. Field of the Invention

The present disclosure relates to a generator, and more particularly, to a generator capable of effectively removing heat generated in a bearing by securing a flow path for cooling air passing through the bearing supporting a rotation shaft.

2. Description of the Related Art

In general, a generator is an apparatus that receives mechanical energy from an external power source and converts the mechanical energy into electrical energy. Here, the external power source may be a turbine, a water wheel, an electric motor, a gas engine, or the like.

When the external power source of the generator is a gas engine, the reciprocating motion of a piston of the gas engine may be converted into a rotational motion by a crankshaft connected to a connecting rod. In this case, a rotation shaft of the generator connected to a crankshaft pulley by a belt rotates a rotor to induce a current in a coil wound on a stator, so that the generator can generate power.

The generator may have a bearing by which the rotation shaft is rotatably supported. Here, the bearing can support the self-weight of the rotation shaft and a load applied to the rotation shaft while fixing the rotation shaft in a certain position. However, there is a problem that heat generated in the bearing due to friction or the like with the rotation shaft may cause damage or deformation of the bearing.

The generator according to the related art has a fully enclosed housing, but indirectly removes heat generated in each component of the generator, including the bearing, by flowing air to the outside of the housing using a fan. However, such a cooling method cannot effectively remove the heat generated in the generator.

Accordingly, Korean Patent Publication No. 10-2002-0021874 discloses a technology in which a generator has an open housing, and a fan is used to flow air into the housing to directly remove heat generated from each component of the generator. However, the above mentioned Korean Patent Publication has a problem in that the flow path of air flowing by the fan is formed only through a gap formed between a rotor and a stator, so that heat generated in a component (e.g., a bearing) separated from the gap cannot be effectively removed, and it is difficult to sufficiently secure the air volume of air passing through the inside of the housing.

SUMMARY OF THE INVENTION

A first problem to be solved by the present disclosure is to provide a generator capable of directly removing heat generated in a bearing supporting a rotation shaft.

A second problem to be solved by the present disclosure is to provide a generator capable of preventing thermal damage to the bearing by sufficiently securing a flow path for cooling air passing through the bearing.

In order to solve the above problem, a generator according to the present disclosure includes: a housing forming an outer shape; a rotation shaft that is at least partially inserted into the housing, and rotated according to external power; a rotor coupled to the rotation shaft and rotated together when the rotation shaft is rotated; a stator that is positioned between an inner surface of the housing and an outer surface of the rotor, and wound around with a coil; a cooling module including a fan cover coupled to the housing, and a fan installed inside the fan cover to cause a flow of an air passing through the inside of the housing when a certain power is supplied; and a rotation support part including a cylindrical bearing holder positioned inside the housing, and a bearing which is coupled to an inner circumferential surface of the bearing holder and rotatably supports the rotation shaft. In this case, the bearing holder may effectively remove heat generated in the bearing by forming a flow path of the air flowing by the fan in at least one of an inner side and an outer side.

The housing com includes: a body forming a side outer shape; a front cover coupled to one end of the body and having a plurality of first holes through which the air flowing by the fan passes; and a rear cover coupled to the other end of the body and having a plurality of second holes through which the air flowing by the fan passes, wherein the rotation shaft passes through the front cover and the rear cover sequentially, and receives the external power from an outside of the front cover, wherein the fan cover is coupled to the rear cover and has a plurality of third holes through which air introduced into the fan passes.

A plurality of rotation support parts are provided, a first rotation support part, which is portion of the plurality of rotation support parts, is coupled to the front cover, and a second rotation support part excluding the first rotation support part among the plurality of rotation support parts is coupled to the rear cover.

The bearing holder of the first rotation support part has a plurality of fins protruding in a radially outward direction that are formed on an outer circumferential surface, and each of the plurality of fins is extended in a longitudinal direction of the bearing holder of the first rotation support part, and is positioned to be spaced apart from each other by a certain distance in a circumferential direction of the bearing holder of the first rotation support part.

The bearing holder of the second rotation support part has a plurality of paths recessed in the radially outward direction that are formed on an inner circumferential surface, and each of the plurality of paths is formed to pass through both ends of the bearing holder in a longitudinal direction of the second rotation support part, and is spaced apart from each other by a certain distance in a circumferential direction of the bearing holder of the second rotation support part.

BRIEF DESCRIPTION OF THE DRAWINGS

The above and other objects, features and advantages of the present disclosure will be more apparent from the following detailed description in conjunction with the accompanying drawings, in which:

FIGS. 3A and 3B are perspective views of a front cover to which a first rotation support part is coupled and a rear cover to which a second rotation support part is coupled according to an embodiment of the present disclosure;

DETAILED DESCRIPTION OF THE PREFERRED EMBODIMENTS

Figure 1:
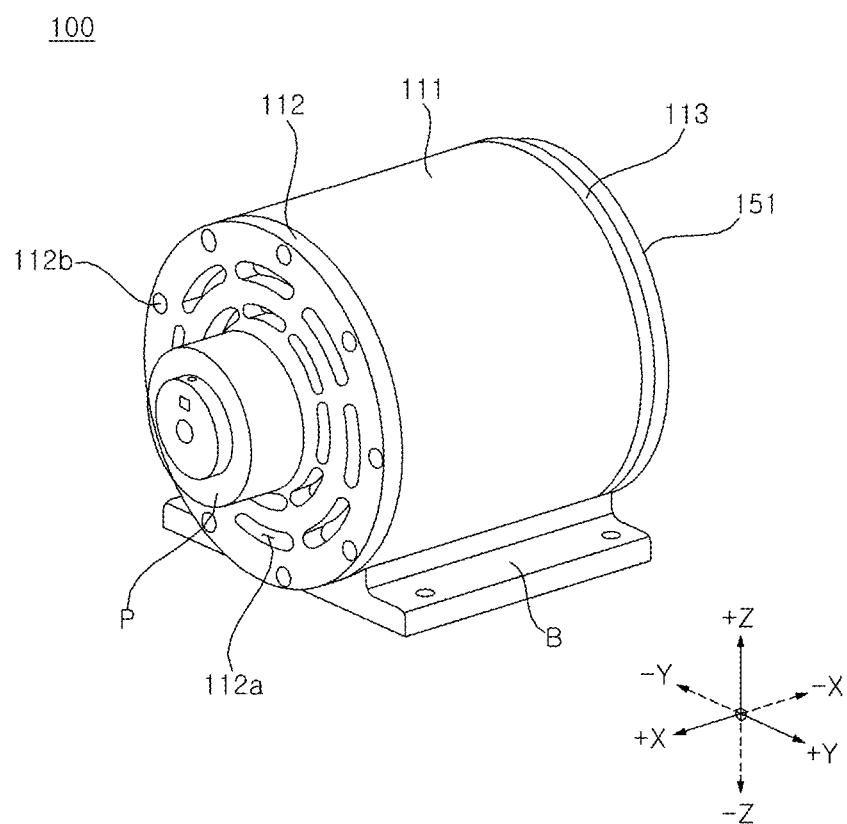
FIG. 1 is a perspective view of a generator according to an embodiment of the present disclosure.

Advantages and features of the present disclosure and methods for achieving them will be made clear from the embodiments described below in detail with reference to the accompanying drawings. The present disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. The present disclosure is defined only by the scope of the claims. Like reference numerals refer to like elements throughout the specification.

The present disclosure may be described based on a space orthogonal coordinate system by X-axis, Y-axis and Z-axis that are orthogonal to each other shown in FIG. 1, and the like. In this specification, the X-axis, Y-axis, and Z-axis are defined with a vertical direction as the Z-axis direction and a front-rear direction as the X-axis direction. Each axis direction (X axis direction, Y axis direction, Z axis direction) means both directions in which each axis extends. The '+' sign in front of each axis direction (+X-axis direction, +Y-axis direction, +Z-axis direction) means a positive direction which is one of both directions in which each axis extends. The '−' sign in front of each axis direction (−X-axis direction, −Y-axis direction, −Z-axis direction) means a negative direction which is the other direction of both directions in which each axis extends.

The present disclosure relates to a generator that receives mechanical energy from an external power source and converts it into electrical energy, and a gas engine may be exemplified as an external power source. That is, a piston accomplishes a linear reciprocating motion according to a combustion reaction between fuel gas and air in the cylinder of a gas engine, and the reciprocating motion of the piston can be converted into a rotational motion by a crankshaft connected to a connecting rod. In this case, the rotation shaft of the generator connected to a crankshaft pulley by a belt rotates a rotor and induces a current in a coil wound on a stator, so that the generator can generate power.

Such a generator may have a heat generation problem due to a loss of the generator (including copper loss, mechanical loss, iron loss, permanent magnet loss, etc.). That is, when heat generated in each component of the generator is not discharged to the outside and stays inside the generator, it may cause a burnout of generator or a degradation of generator performance. In particular, if heat generated in the bearing due to friction or the like with the rotation shaft is not sufficiently removed, it may cause damage or deformation of the bearing. Accordingly, it may result in unstable rotation of the rotation shaft or serious damage to the generator.

Accordingly, the present disclosure is devised to propose a structure for effectively removing heat generated in each component of a generator including bearing, which will be described in more detail later.

Hereinafter, a generator according to an embodiment of the present disclosure will be described in more detail with reference to FIGS. 1 to 5.

Figure 2:
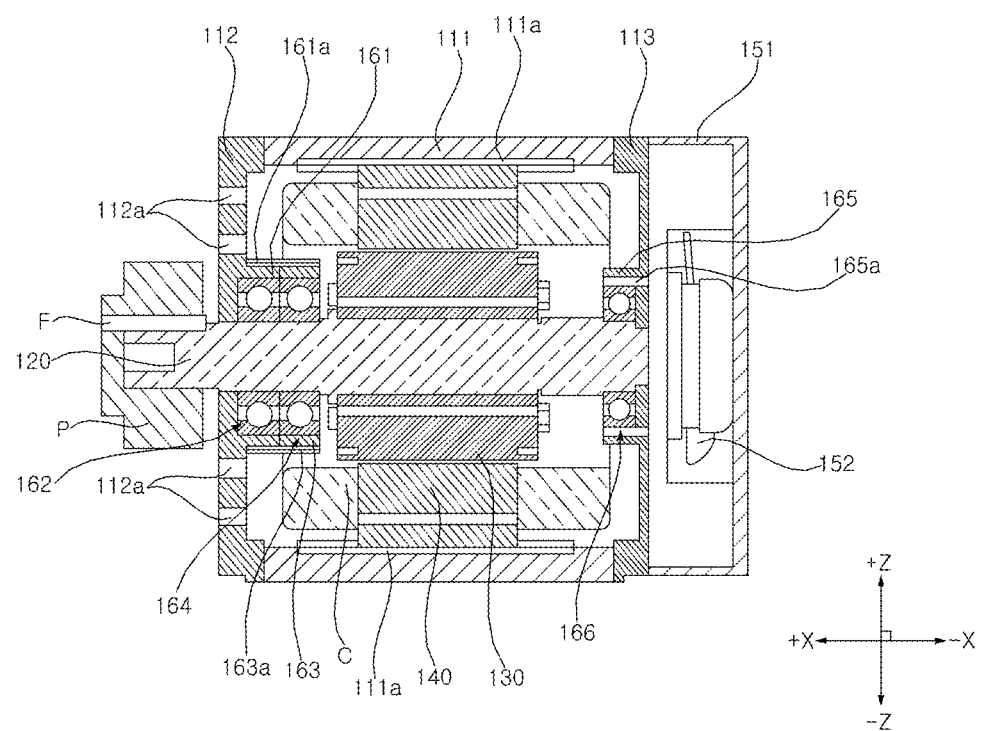
FIG. 2 is a cross-sectional view of a generator according to an embodiment of the present disclosure.

FIG. 1 is a perspective view of a generator according to an embodiment of the present disclosure. FIG. 2 is a cross-sectional view of a generator according to an embodiment of the present disclosure.

Referring to FIG. 1, the generator 100 includes a housing 110 that forms an outer shape and is formed in a cylindrical shape as a whole, and a base B coupled to the lower side of the housing 110 to fix the generator 100 in a certain position. The housing 110 includes a body 111, a front cover 112, and a rear cover 113, and a certain space is formed therein so that each component of the generator 100 described later can be accommodated inside the housing 110.

Referring to FIG. 2, the generator 100 includes a rotation shaft 120, a rotor 130, a stator 140, a cooling module 150, and a rotation support unit 160.

At least a portion of the rotation shaft 120 may be inserted into the housing 110. The rotation shaft 120 may be formed in a cylindrical shape as a whole and may be manufactured of a nonmagnetic material through which magnetic flux does not flow. The rotation shaft 120 may be rotated according to external power, and for this purpose, one end portion of the rotation shaft 120 (i.e. end portion of the +X axis direction) may be fixed to a rotation shaft pulley P via a fixing fin F. As an example, when the rotation shaft pulley P connected to the crankshaft pulley by the belt is rotated, the rotation shaft 120 may also be rotated together.

The rotor 130 is formed in a cylindrical shape, and may have a magnet therein. The rotor 130 may be rotated together with the rotation shaft 120 when the rotation shaft 120 is rotated as the inner circumferential surface of the rotor 130 is coupled to the rotation shaft 120, and may be also called a rotator. The stator 140 is formed in a cylindrical shape and may be positioned between the inner surface of the housing 110 and the outer surface of the rotor 130. The stator 140 may be fixed to a certain position as the inside of the housing 110, and is also called a stationary core. A coil C may be wound on one side of the stator 140. As a result, when the rotor 130 is rotated, a current is induced in the coil C wound around the stator 140 so that the generator 100 can generate power.

A cooling module 150 includes a fan cover 151 coupled to the housing 110 and a fan 152 installed inside the fan cover 151. The fan cover 151 is formed separately from the housing 110 and is coupled to the housing 110 by adhesive or screw fastening, but in some embodiments, the fan cover 151 and the housing 110 can be formed integrally from the beginning. The fan 152 may cause the flow of the air passing through the inside of the housing 110.

To this end, the fan 152 may be provided such that one side is connected to the rotation shaft 120 to rotate together when the rotation shaft 120 is rotated. However, in this case, when the rotation shaft 120 is not rotated, the inside of the generator 100 cannot be cooled and even when the rotation shaft 120 is rotated, the operation of the fan 152 is dependent on the rotation speed of the rotation shaft 120 and thus it may be difficult to efficiently cool the inside of the generator 100. Accordingly, it is preferable that the fan 152 is provided to receive a certain power from an external power source provided separately from the generator 100. Meanwhile, a flow path of the air flowing by the fan 152 will be described later.

A rotation support part 160 includes a cylindrical bearing holder 161, 163, 165 positioned inside the housing 110, and a bearing 162, 164, 166 which is coupled to the inner circumferential surface of the bearing holder 161, 163, 165 and rotatably supports the rotation shaft 120. The bearing 162, 164, 166 may support the self-weight of the rotation shaft 120 and a load applied to the rotation shaft 120 while fixing the rotation shaft 120 to a certain position inside the housing 110. Here, the load applied to the rotation shaft 120 is a tension applied to the belt and may be transmitted to the rotation shaft 120 through the rotation shaft pulley P. The bearing holder 161, 163, 165 may have a flow path of the air flowing by the fan formed in at least one of the inside and the outside, which will be described in more detail later.

A plurality of rotation support parts 160 may be provided. Accordingly, the rotation shaft 120 can be supported more firmly, and in this case, a first rotation support part, which is a portion of the plurality of rotation support parts 160, is coupled to the front cover 112, and a second rotation support part excluding the first rotation support part, among the plurality of rotation support parts 160, may be coupled to the rear cover 113. In addition, since the rotation shaft 120 receives the external power from the rotation shaft pulley P positioned outside the front cover 112, more load may be applied to the first rotation support part coupled to the front cover 112. Accordingly, it may be preferable that at least two first rotation support parts are provided, and the at least two first rotation support parts are coupled to each other to support the rotation shaft 120.

Meanwhile, the bearing 162, 164, 166 may be a ball bearing as shown in FIG. 2. However, in some embodiments, it is obvious that sleeve bearing, ball bearing, roller bearing, etc. may be the bearing of the present disclosure. The bearing 162, 164, 166 is coupled to the rotation shaft 120 and rotated to generate heat due to friction, but heat can be effectively removed by a heat dissipation structure of the present disclosure described later.

FIG. 3 is a perspective view of a front cover to which a first rotation support part is coupled and a rear cover to which a second rotation support part is coupled according to an embodiment of the present disclosure.

Referring to FIGS. 2 and 3, the housing 110 may include a body 111 forming a side outer shape, a front cover 112, and a rear cover 113. The front cover 112 may have a plurality of first holes 112a which are coupled to one end (i.e. the distal end of the +X axis direction) of the body 111, and through which air flowing by the fan 152 passes. The rear cover 113 may have a plurality of second holes 113a which are coupled to the other end (i.e., the distal end of the −X axis direction) of the body 111, and through which air flowing by the fan 152 passes.

The front cover 112 is formed in a circular plate shape as a whole, and a plurality of coupling holes 112b are formed in the circumferential direction, so that the screw is screwed to one end of the body 111 through the coupling hole 112b and accordingly, the front cover 112 and the body 111 may be coupled. The rear cover 113 is formed in the shape of a wheel as a whole, and a plurality of coupling holes 113b are formed in the circumferential direction, so that the screw is screwed to the other end of the body 111 through the coupling hole 113b and accordingly, the rear cover 113 and the body 111 may be coupled. The fan cover 151 may be coupled to the rear cover 113.

The bearing holder 161, 163 of the first rotation support part may be coupled to a side surface (i.e. a side surface of the −X axis direction) of the front cover 112 toward the inside of the body 111. The bearing holder 165 of the second rotation support part may be coupled to a side surface (i.e. a side surface of the +X axis direction) of the rear cover 113 toward the inside of the body 111. In this case, the bearing 162, 164 is coupled to the inner circumferential surfaces of the bearing holder 161, 163 of the first rotation support part to support the rotation of the rotation shaft 120, and the bearing 166 is coupled to the inner circumferential surface of the bearing holder 165 of the second rotation support part to support the rotation of the rotation shaft 120. Meanwhile, as described above, the rotation shaft 120 sequentially passes through the front cover 112 and the rear cover 113 and can receive the external power from the outside of the front cover 112.

Each of the plurality of first holes 112a extends in a direction corresponding to the circumferential direction of the front cover 112, and may be positioned to be spaced apart from each other by a certain distance in the outer direction from a portion of the front cover 112 to which the bearing holder 161, 163 of the first rotation support part is coupled.

Each of the plurality of second holes 113a extends outwardly from a portion of the rear cover 113 to which the bearing holder 165 of the second rotation support part is coupled and may positioned spaced apart each other by a certain distance in the circumferential direction of the rear cover 113. That is, the rear cover 113 includes a cylindrical central body 1131 positioned in the center, a ring-shaped outer body 1133 positioned in the outer edge, and a plurality of bar-shaped bridges 1132 connecting the central body 1131 and the outer body 1133, and a second hole 113a may be formed between each of the plurality of bridges 1132.

While the front cover 112 serves to cover the front of the generator 100 against the outside in addition to providing an installation space for the first rotation support part, the rear cover 113 serves to partition the housing 110 and the fan cover 151 in addition to providing an installation space of the second rotation support part (i.e. the fan cover 151 serves to cover the rear of the generator 100 against the outside). Therefore, the proportion occupied by the first hole 112a of the front cover 112 may be relatively smaller than the proportion occupied by the second hole 113a of the rear cover 113.

A plurality of fins 161a and 163a protruding in a radially outward direction may be formed on the outer circumferential surface of the bearing holder 161, 163 of the first rotation support part. Each of the plurality of fins 161a and 163a extends in the longitudinal direction (i.e. the X-axis direction) of the bearing holder 161, 163 of the first rotation support part, and may be positioned to be spaced apart each other by a certain distance in the circumferential direction of the bearing holder 161, 163 of the first rotation support. Accordingly, a flow path of air flowing by the fan 152 may be formed in a space formed between the plurality of fins 161a and 163a. That is, through the plurality of fins 161a and 163a, a thermal cross-sectional area between the heat generated in the bearing 162, 164 and the air flowing by the fan 152 may be increased.

A plurality of paths 165a recessed in a radially outward direction may be formed on an inner peripheral surface of the bearing holder 165 of the second rotation support part. Each of the plurality of paths 165a is formed to penetrate both ends in the longitudinal direction (i.e. the X-axis direction) of the bearing holder 165 of the second rotation support part, and may be positioned spaced apart by a certain distance from each other in the circumferential direction of the bearing holder 165 of the second rotation support part. Accordingly, a flow path for air flowing by the fan 152 may be formed in each of the plurality of paths 165a. That is, through the plurality of paths 165a, the heat generated in the bearing 166 can be directly and efficiently removed by the air passing therethrough.

Meanwhile, the cross section of each of the plurality of fins 161a and 163a may have a polygonal shape, and the cross section of each of the plurality of paths 165a may be formed in a "□" or "C" shape, but is limited thereto. In addition, by forming a plurality of fins 161, 163a in the first rotation support part coupled to the front cover 112 adjacent to the portion of the rotation shaft 120 to which external power is transmitted, it is possible not only to improve the above-described cooling performance, but also to secure the rigidity of the bearing holder 161, 163 of the first rotation support part to which a relatively large load in comparison with the second rotation support part is applied. On the other hand, as a plurality of paths 165a are formed in the second rotation support part coupled to the rear cover 113 spaced apart from the portion of the rotation shaft 120 to which external power is transmitted, cooling performance can be maximized by allowing air flowing by the fan 152 to directly pass through the outer circumferential surface of the bearing 166.

Figure 4:
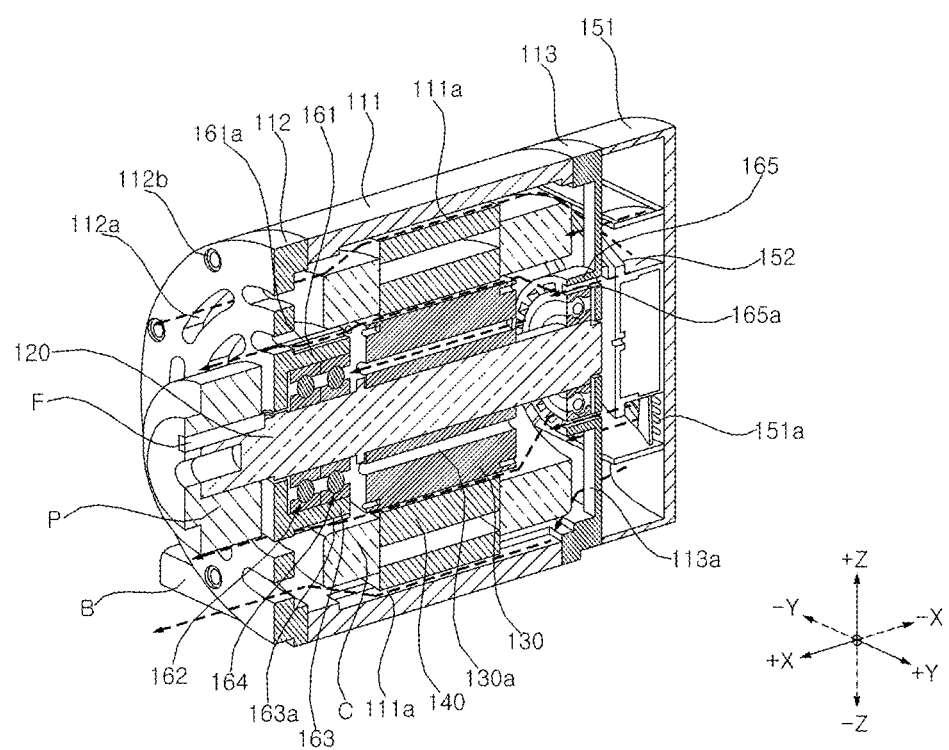
FIG. 4 is a cutaway perspective view showing a partial configuration of a generator according to an embodiment of the present disclosure.

FIG. 4 is a cutaway perspective view showing a partial configuration of a generator according to an embodiment of the present disclosure.

Referring to FIG. 4, the outer surface of the rotor 130 is spaced apart from the inner surface of the stator 140 by a certain distance, and a rotor hole (no reference numeral) through which air flowing by the fan 152 passes may be formed inside the rotor 130. In addition, a plurality of grooves 111a that are depressed in an outward direction may be formed on the inner surface of the body 111. In this case, at least a portion of the outer surface of the stator 140 may form a flow path of air flowing by the fan 152 between the groove 111a. A plurality of third holes 151a through which air introduced into the fan 152 passes may be formed on the rear side surface of the fan cover 151 (i.e. the side surface of the −X axis direction). Referring to the dotted arrow in FIG. 4, a flow path of air passing through the inside of the housing 110 will be described as follows.

The air flowed into the fan 152 through the plurality of third holes 151a is blown forward by the fan 152, and may pass through the second hole 113a and the path 165a formed in the rear cover 113. Thereafter, the air flowing by the fan 152 may pass through between the outer surface of the stator 140 and the groove 111a, between the outer surface of the rotor 130 and the inner surface of the stator 140, and the rotor hole. Then, the air flowing by the fan 152 may pass through a component positioned in front of the rotor 130 and the stator 140 including the fin 161a, 163a, and be then discharged to the outside through the first hole 112a.

Thus, the air flowing inside the housing 110 by the fan 152 can effectively remove not only the heat generated in the rotor 130, the stator 140, and the coil C, but also the heat generated in the bearing 162, 164, and 166.

Figure 5:
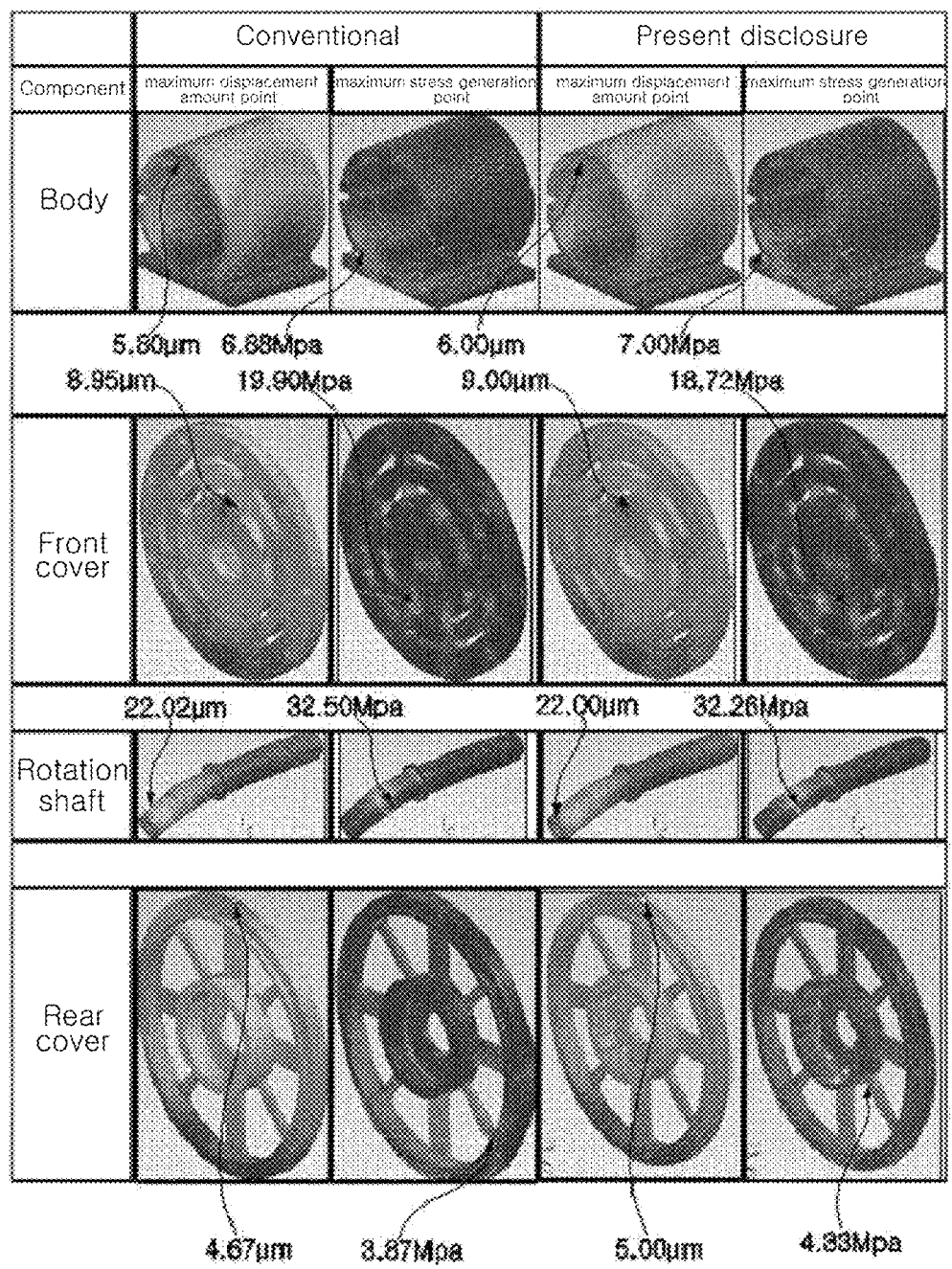
FIG. 5 is a view comparing a maximum displacement amount point and a stress generation point of each component of the generator depending on whether a fin or a path is formed in a bearing holder according to an embodiment of the present disclosure.

FIG. 5 is a view comparing a maximum displacement amount point and a stress generation point of each component of the generator depending on whether a fin or a path is formed in a bearing holder according to an embodiment of the present disclosure.

When tension is applied to the belt, each component of the generator 100 may receive stress in response thereto. As described above, in the present disclosure, the fin 161a, 163a is formed in the bearing holder 161, 163 of the first rotation support part, and a path 165a may be formed in the bearing holder 165 of the second rotation support part. Depending on whether the generator 100 is provided with the fin 161a, 163a and the path 165a as a bearing heat dissipation structure, it is confirmed through repeated experiments whether a change occurs in the maximum displacement amount point and the stress generation point of each component of the generator 100, and the result is shown in FIG. 5.

Referring to FIG. 5, in the conventional case, that is, when tension is applied to the belt when a fin or path is not formed in each of the bearing holder 161, 163 of the first rotation support part and the bearing holder 165 of the second rotation support part, the maximum displacement point and the maximum stress point of the body 111, the front cover 112, the rear cover 113, and the rotation shaft 120 can be checked.

In comparison, in the case of the present disclosure, that is, when tension is applied to the belt in the case where each of the fin 161a, 163a and the path 165a is formed in each of the bearing holder 161, 163 of the first rotation support part and the bearing holder 165 of the second rotation support part, the maximum displacement point and the maximum stress point of the body 111, the front cover 112, the rear cover 113, and the rotation shaft 120 can be checked.

That is, in the conventional case, the point of the maximum displacement amount of the body 111 is adjacent to the upper side of the shear surface and its value is 5.80 μm, and in the case of the present disclosure, the point of the maximum displacement amount of the body 111 is also adjacent to the upper side of the shear surface and its value is 6.00 μm. Accordingly, it can be seen that there is only a slight difference from the conventional case. In addition, in the conventional case, the maximum stress point of the body 111 is adjacent to a point spaced apart by a certain distance in the clockwise direction from the lower side of the shear surface and its value is 6.88 MPa, and in the case of the present disclosure, the maximum stress point of the body 111 is also adjacent to a point spaced apart by a certain distance in the clockwise direction from the lower side of the shear surface and its value is 7.00 MPa. Accordingly, it can be seen that there is only a slight difference from the conventional case.

Similarly to the body 111, also in the front cover 112, the rear cover 113, and the rotation shaft 120, it can be seen that there is only a slight difference between the conventional case and the case of the present disclosure in the maximum displacement point and the maximum stress point. Thus, while the present disclosure secures the same level of rigidity of the generator 100 in comparison with the conventional case, it can be seen that heat generated in the bearing can be effectively removed through the fin 161a, 163a and the path 165a as a bearing heat dissipation structure.

According to the present disclosure, there are one or more of the following effects.

First, the heat generated in the bearing can be directly removed by the fan causing the flow of the air passing through the inside of housing.

Second, a flow path of the air flowing by the fan is formed inside or outside the bearing holder to which the bearing is coupled, thereby effectively removing the heat generated in the bearing.

Third, a plurality of fins are formed on the outer circumferential surface of the bearing holder adjacent to a portion of the rotation shaft to which external power is input, thereby securing the rigidity of the bearing holder and increasing the heat transfer area between the heat generated in the bearing and the air flowing by the fan.

Fourth, a plurality of paths are formed on the inner circumferential surface of the bearing holder adjacent to a portion of the rotation shaft opposite to a portion to which external power is input, thereby more effectively removing the heat generated in the bearing by securing a flow path for air passing through the bearing.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A generator, comprising:
   a housing forming an outer shape of the generator;
   a rotational shaft that is at least partially inserted into the housing, and rotated according to external power;
   a rotor coupled to the rotational shaft and rotated together with the rotational shaft when the rotational shaft is rotated;
   a stator that is positioned between an inner surface of the housing and an outer surface of the rotor, and around which a coil is wound;
   a cooling module including a fan cover coupled to the housing, and a fan installed inside of the fan cover to generate a flow of air passing through an inside of the housing when a predetermined power is supplied thereto; and
   at least one rotation support part each including a cylindrical bearing holder positioned inside of the housing, and a bearing which is coupled to an inner circumferential surface of the bearing holder and rotatably supports the rotational shaft, wherein the bearing holder includes a flow path for the air blown by the fan, the flow path being formed at at least one of an inner side or an outer side of the bearing holder, and wherei the flow path includes a plurality of paths recessed in a radially outward direction that are formed on an inner circumferential surface of the bearing holder.

2. The generator of claim 1, wherein the housing comprises:
   a body forming a side outer shape of the housing;
   a front cover coupled to a first end of the body and having a plurality of first holes through which the air blown by the fan passes; and
   a rear cover coupled to a second end of the body and having a plurality of second holes through which the air blown by the fan passes, wherein the rotational shaft passes through the front cover and the rear cover sequentially, and receives the external power from an outside of the front cover, and wherein the fan cover is coupled to the rear cover and has a plurality of third holes through which air introduced into the fan passes.

3. The generator of claim 2, wherein the at least one rotation support part comprises a plurality of rotation support parts including:
   a first rotation support part; coupled to the front cover; and
   a second rotation support part coupled to the rear cover.

4. The generator of claim 3, wherein the bearing holder of the first rotation support part includes a plurality of fins that protrudes in the radially outward direction that are formed on an outer circumferential surface thereof, and wherein each of the plurality of fins extends in a longitudinal direction of the bearing holder of the first rotation support part, and is positioned to be spaced apart from each other by a predetermined distance in a circumferential direction of the bearing holder of the first rotation support part.

5. The generator of claim 4, wherein the bearing holder of the second rotation support part has the plurality of paths recessed in the radially outward direction that are formed on an inner circumferential surface thereof, and wherein each of the plurality of paths is formed to pass through both ends of the bearing holder in a longitudinal direction of the second rotation support part, and is spaced apart from each other by a predetermined distance in a circumferential direction of the bearing holder of the second rotation support part.

6. The generator of claim 5, wherein each of the plurality of fins has a cross section formed in a polygonal shape, and each of the plurality of paths has a cross section formed in a "⊏" or "C" shape.

7. The generator of claim 2, wherein the at least one rotation support part comprises at least two first rotation support parts coupled to each other.

8. The generator of claim 3, wherein the bearing holder of the first rotation support part is coupled to a side surface facing an inside of the body among a side surface of the front cover, and wherein the bearing holder of the second rotation support part is coupled to a side surface facing the inside of the body among a side surface of the rear cover.

9. The generator of claim 8, wherein each of the plurality of first holes extends in a direction corresponding to a circumferential direction of the front cover, and is spaced apart each from other by a predetermined distance in an outward direction from a portion of the front cover to which the bearing holder of the first rotation support part is coupled, and wherein each of the plurality of second holes extends outwardly from a portion of the rear cover to which the bearing holder of the second rotation support part is coupled, and is spaced apart from each other by a predetermined distance in a circumferential direction of the rear cover.

10. The generator of claim 9, wherein the rotor has an outer surface spaced apart by a predetermined distance from an inner surface of the stator, and wherein a rotor hole through which air blown by the fan passes is formed inside of the rotor.

11. The generator of claim 10, wherein the body includes a plurality of grooves, which is recessed in an outward direction, formed on an inner surface thereof, and wherein at least a portion of an outer surface of the stator forms a flow path of the air blown by the fan between the plurality of grooves.

12. A generator, comprising:
   a housing forming an outer shape of the generator;
   a rotational shaft that is at least partially inserted into the housing, and rotated according to external power;
   a rotor coupled to the rotational shaft and rotated together with the rotational shaft when the rotational shaft is rotated;
   a stator that is positioned between an inner surface of the housing and an outer surface of the rotor, and around which a coil is wound;
   a cooling module including a fan cover coupled to the housing, and a fan installed inside of the fan cover to generate a flow of air passing through an inside of the housing when a predetermined power is supplied thereto; and at least one rotation support part each including a cylindrical bearing holder positioned inside of the housing, and a bearing which is coupled to an inner circumferential surface of the bearing holder and rotatably supports the rotational shaft, wherein the bearing holder includes a flow path for the air blown by the fan, the flow path being formed at at least one of an inner side or an outer side of the bearing holder, wherein the housing comprises:
a body forming a side outer shape of the housing;
a front cover coupled to a first end of the body and having a plurality of first holes through which the air blown by the fan passes; and
a rear cover coupled to a second end of the body and having a plurality of second holes through which the air blown by the fan passes, wherein the rotational shaft passes through the front cover and the rear cover sequentially, and receives the external power from an outside of the front cover, wherein the fan cover is coupled to the rear cover and has a plurality of third holes through which air introduced into the fan passes, wherein the at least one rotation support part comprises a plurality of rotation support parts including:
a first rotation support part coupled to the front cover; and
a second rotation support part coupled to the rear cover, and wherein the bearing holder of the first rotation support part includes a plurality of fins that protrudes in the radially outward direction that are formed on an outer circumferential surface thereof, and wherein each of the plurality of fins extends in a longitudinal direction of the bearing holder of the first rotation support part, and is positioned to be spaced apart from each other by a predetermined distance in a circumferential direction of the bearing holder of the first rotation support part.

13. The generator of claim 12, wherein the bearing holder of the second rotation support part has the plurality of paths recessed in the radially outward direction that are formed on an inner circumferential surface thereof, and wherein each of the plurality of paths is formed to pass through both ends of the bearing holder in a longitudinal direction of the second rotation support part, and is spaced apart from each other by a predetermined distance in a circumferential direction of the bearing holder of the second rotation support part.

14. The generator of claim 13, wherein each of the plurality of fins has a cross section formed in a polygonal shape, and each of the plurality of paths has a cross section formed in a "⊏" or "C" shape.

15. A generator, comprising:
a housing forming an outer shape of the generator;
a rotational shaft that is at least partially inserted into the housing, and rotated according to external power;
a rotor coupled to the rotational shaft and rotated together with the rotational shaft when the rotational shaft is rotated;
a stator that is positioned between an inner surface of the housing and an outer surface of the rotor, and around which a coil is wound;
a cooling module including a fan cover coupled to the housing, and a fan installed inside of the fan cover to generate a flow of air passing through an inside of the housing when a predetermined power is supplied thereto; and
at least one rotation support part each including a cylindrical bearing holder positioned inside of the housing, and a bearing which is coupled to an inner circumferential surface of the bearing holder and rotatably supports the rotational shaft, wherein the bearing holder includes a flow path for the air blown by the fan, the flow path being formed at at least one of an inner side or an outer side of the bearing holder, wherein the housing comprises:
a body forming a side outer shape of the housing;
a front cover coupled to a first end of the body and having a plurality of first holes through which the air blown by the fan passes; and
a rear cover coupled to a second end of the body and having a plurality of second holes through which the air blown by the fan passes, wherein the rotational shaft passes through the front cover and the rear cover sequentially, and receives the external power from an outside of the front cover, and wherein the fan cover is coupled to the rear cover and has a plurality of third holes through which air introduced into the fan passes, wherein the at least one rotation support part comprises a plurality of rotation support parts including:
a first rotation support part coupled to the front cover; and
a second rotation support part coupled to the rear cover, wherein the bearing holder of the first rotation support part is coupled to a side surface facing an inside of the body among a side surface of the front cover, and wherein the bearing holder of the second rotation support part is coupled to a side surface facing the inside of the body among a side surface of the rear cover the body includes a plurality of grooves, which is recessed in an outward direction, formed on an inner surface thereof, and wherein at least a portion of an outer surface of the stator forms a flow path of the air blown by the fan between the plurality of grooves.

16. The generator of claim 15, wherein each of the plurality of first holes extends in a direction corresponding to a circumferential direction of the front cover, and is spaced apart each from other by a predetermined distance in an outward direction from a portion of the front cover to which the bearing holder of the first rotation support part is coupled, and wherein each of the plurality of second holes extends outwardly from a portion of the rear cover to which the bearing holder of the second rotation support part is coupled, and is spaced apart from each other by a predetermined distance in a circumferential direction of the rear cover.

17. The generator of claim 16, wherein the rotor has an outer surface spaced apart by a predetermined distance from an inner surface of the stator, and wherein a rotor hole through which air blown by the fan passes is formed inside of the rotor.

* * * * *